(12) United States Patent
Stone

(10) Patent No.: US 7,619,514 B1
(45) Date of Patent: Nov. 17, 2009

(54) METHOD FOR PROVIDING A PROXIMITY ALERT

(76) Inventor: Richard John Stone, P.O. Box 1367, Stafford, TX (US) 77497

( * ) Notice: Subject to any disclaimer, the term of this patent is extended or adjusted under 35 U.S.C. 154(b) by 0 days.

(21) Appl. No.: 12/355,952

(22) Filed: Jan. 19, 2009

(51) Int. Cl.
*G08B 1/08* (2006.01)
(52) U.S. Cl. ................................. 340/539.13
(58) Field of Classification Search .......... 340/539.13, 340/309.16, 686.6, 996, 988; 455/456.1, 455/457; 715/963
See application file for complete search history.

(56) References Cited

U.S. PATENT DOCUMENTS

| | | | |
|---|---|---|---|
| 7,084,758 B1 * | 8/2006 | Cole | 340/539.11 |
| 7,292,865 B2 * | 11/2007 | Contractor | 455/456.1 |
| 7,502,687 B2 * | 3/2009 | Flick | 701/213 |
| 2004/0207522 A1 * | 10/2004 | McGee et al. | 340/539.13 |
| 2005/0012611 A1 * | 1/2005 | Osman | 340/539.13 |

* cited by examiner

*Primary Examiner*—Phung Nguyen
(74) *Attorney, Agent, or Firm*—Buskop Law Group, PC; Wendy Buskop

(57) ABSTRACT

A method for providing an alert when a user has entered a specified proximity to a desired location within a predetermined time window. The methods can include the steps of establishing a current location of a user, providing a time window for visiting a desired location, providing the name and coordinates of the desired location; and providing distance of notification, where an alert is issued once the user has entered the distance of notification from a desired location within the time wind established for that desired location.

25 Claims, 2 Drawing Sheets

METHOD FOR PROVIDING A PROXIMITY ALERT

FIELD

The present embodiments generally relate to a method for providing a time and proximity based user alert, and to a method for providing a user with alerts when the user enters a specified distance from a preselected location within a preselected timeframe.

BACKGROUND

A need exists for a method of alerting a user when the user has entered the proximity of a location the user intends to visit. For example, a need exists for a method of selecting locations and time frames in which the user wishes to visit those locations. Previous GPS devices require a user to select a location and then the GPS system can provide directions and a travel time to the selected location from a current location. A need exists for a method allowing a user to select multiple locations, which alerts the user when they are near one of the locations.

A need exists for a method of providing a user with convenient reminders relating to visiting preselected locations, such as running errands when the user is near the preselected location. By providing a reminder when a user enters a certain distance from a preselected location, the methods provide an advantage in potentially saving users a great deal of time. An alert notifying the user they are in the proximity to the location required for the errand may save a complete trip later, or may save a less efficient trip.

A further need exist for a method of providing a user with notifications of sales and promotions at desired locations when the user passes near those locations during the sale or promotion periods.

A further need exists for a method that provides a user with real time updates and alternate routes in the event of hazards such as severe weather and other natural disasters.

The present embodiments meet these needs.

BRIEF DESCRIPTION OF THE DRAWINGS

The detailed description will be better understood in conjunction with the accompanying drawings as follows.

Figure 1:
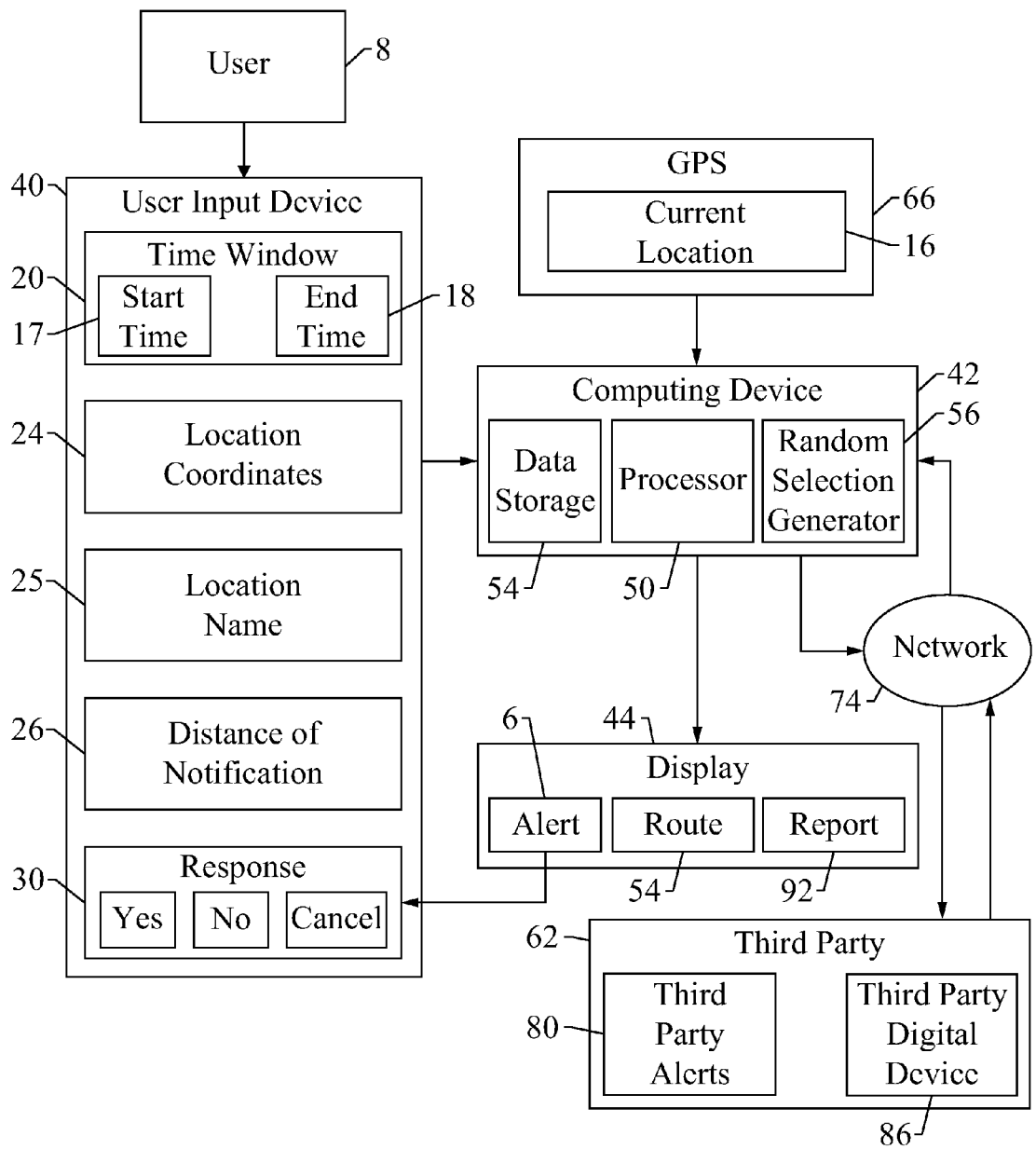
FIG. 1 illustrates a schematic representation of a method in accordance with certain embodiments of the present invention.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a method for providing at least one alert to a user on proximity to a desired location within a preselected time window. The method can begin with the step of establishing a current location of a user associated with a processor for tracking the location of the user. The current location can be established through the use of a global positioning system "GPS," such as a Palm Pre produced by Palm, Inc. of the USA. The current location can be identified as a street address, a map grid location, as the present location for future use or as a latitude and longitude.

The method can include the step of a user providing at least one start time and at least one end time associated with the start time, forming at least one time window. The time window can be as short as a few minutes, or can span multiple years. These times can be inputted into a processor through a user input device such as a touch screen, a key pad, a microphone with associated voice recognition software, shaking the device or by aligning the device to a compass heading and shaking. One example of an input device with this kind of inputs is a Palm Pre produced by Palm, Inc. of the USA.

The method can further comprise the step of a user entering coordinates of at least one desired location into the processor. The coordinates can be entered as a street address, a map grid location, as the present location for future use or as a longitude and latitude.

The user can then enter a name, a level of importance and a category corresponding to each desired location.

The user can then enter at least one distance of notification into the processor. This distance of notification can represent an acceptable distance for making detours to the desired locations which have been stored on the processor. Each desired location can have a unique distance of notification, or there can be a default value, such as 5 miles, set for the distance of notification.

The user can then enter a desired approaching direction so that the notification can only take place if the approach to the desired location was from this direction Embodiments of the present method can then request an alert when the current location is within the distance of notification of a desired location. Computer instructions written into data storage associated with the processor can determine the distance from the current location to each desired location and compare those values to each distance of notification. The computer instructions stored in the data storage can be executed by the processor to form an alert and prompt the user for a response by informing the user they are within some distance of a desired location. The computer instructions can be further executed on the processor to present the user with a question through a display. The display can be a LCD display used on a TMobile Dash of the USA.

The computer instructions can prompt a display device to display a question to the user. The computer instructions can ask the user if the user would like to proceed to the desired location.

The user can then respond to the prompted question through the input device by entering yes, which can then terminate further alerts for the specified desired location, by entering no, which can delay alerts for another route, or by entering cancel, which can terminate further alerts.

Further embodiments of the present method provide that when the response to the alert is "no", alerts can be provided during subsequent time windows in chronology, when the desired location is within the distance of notification.

As an example, a user may wish to run errands over the weekend, without having a particular sense of timing or urgency for these errands. The user can enter each location and a name corresponding to each location, a pre-named location or a previously defined and stored group of locations. The user can then select a 5 mile distance of notification for each location. As the user travels through out the course of the weekend, the processor can produce an alert each time throughout the weekend that the user is within 5 miles of one of the desired locations.

The user can respond to each alert with a "yes," "no," or "cancel." The processor can have stored thereon instructions executed for each answer. Upon an answer of "yes" the processor can map a route to the desired location. Upon an answer of "no" the alert can be turned off for a period of time. Upon an answer of "cancel" further alerts can be turned off.

Embodiments of the present invention can include the alerts grouped by topic, by category, previously defined to do list or by previous used groups. For example, doctor's offices and hospitals, pharmacies, friends, business colleagues, preferred restaurants, gyms and previously used grouped locations can each have their own category.

The method can further include alerts used for entertainment. In one embodiment, one of several entertainment locations can be selected by the random selection generator from a list of multiple entertainment locations.

In one embodiment, the alerts can be grouped and each group can be assigned a different priority code. The priority codes can be different audio decibel levels, different audio tunes, different flashing lights, different digital animations, or combinations thereof.

In another embodiment, the user can form a second time window that can be different from the first time window. The second time window can also be identical in duration to the first time window but for at least one different day. The second time window can also be identical in duration to the first time window but in part overlaps the first time window.

In one embodiment, the first time window can repeat at intervals defined by the user, at standardized intervals, or at intervals specified by a third party. For example, the first window can be set for specific times everyday of the week or on certain days of the week.

In one embodiment, a predefined group of events can repeat at intervals defined by the user, at standardized intervals, or at intervals specified by a third party. For example, the group can be set for specific times everyday of the week or on certain days of the week.

In yet another embodiment the alerts, responses, or combinations thereof, can be standardized messages.

In one embodiment upon entry of the "yes" response, a route can be planned using the processor, preprogrammed maps, and a GPS, to the desired location's coordinates and presented to the user. The preprogrammed maps can include those available from Garmin of the USA. In one embodiment of the present method the user can input a start location and an end location for the route, and alerts are provided along the route.

In one embodiment, the method can further include a network, wherein the network can comprise a satellite network, a cellular network, a local area network, a wide area network, a global communication network or combinations thereof for communicating to the user.

In yet another embodiment, the user can subscribe to a customized alert system from specific vendors to provide private sales information. These third party alerts from vendors can provide the time windows, which can correspond to sales, specials or other promotional events.

In one embodiment, the user traverses the route using a global positioning system. The global positioning system can be one such as Garmin Mobile produced by Garmin of USA.

In yet another embodiment, a third party can offer alerts to a user when a facility of the third party is within the distance of notification. For example, the third party can be a merchant or a franchise providing their location information on the users system.

In another embodiment the user can subscribe to the third party offered alerts. In yet another embodiment, the user can receive compensation for subscribing to the third party offered alerts. In a further embodiment, the third party offered alerts can be an advertising of a service or product.

In another embodiment, the third party can be a friend of the user and the alert can enable friends to reconnect within the distance of notification.

In one embodiment, a wireless device of the user can be contacted by another digital device of the user, to provide alerts. For example, alerts can be transmitted from a car or a system including a GPS to a user's phone.

In another embodiment, a wireless device of the user can be stationary, and can be contacted by a third party digital device and provide an alert when the third party moves into the distance of notification. For example, a user can have a wireless device in their home which issues alerts when third party devices are within the distance of notification. As one example, the stationary device can provide alerts when cable or utility personal are working near the uses home or when an expected guest is within a specified distance of the wireless device.

In yet another embodiment, the user can receive hazard alerts concerning hazards from a third party digital notification system. For example, alerts can be issued in the case of a natural disaster, bad weather, flooded road, traffic conditions and accidents or an ankle bracelet worn by a criminal.

In one embodiment GPS can provide a detour route around the hazard indicated in the hazard alert.

In yet another embodiment, the response can be an audio response, where the user speaks a response, a mechanical response, where the user pushes a button, or a visual response, which can include providing a sequence of lights. The user response can also be combinations of these responses.

One embodiment can include the step of forming a report of desired locations not visited.

Figure 2:
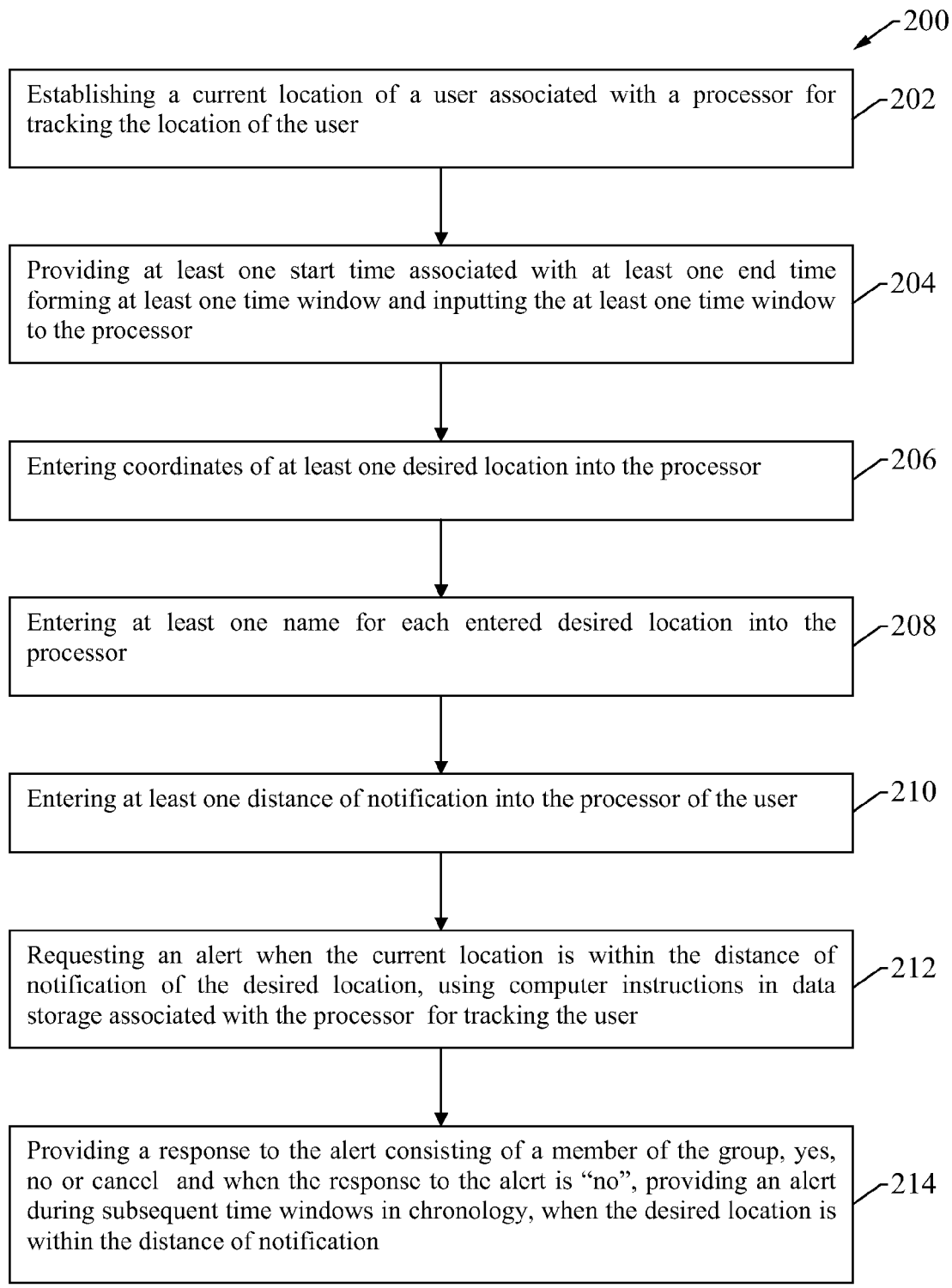
FIG. 2 illustrates a flow diagram of a method in accordance with certain embodiments of the present invention.

Turning now to the figures, FIG. 1 illustrates a schematic representation of the flow of information associated with certain embodiments of the present invention. FIG. 2 illustrates a computing device 42 in communication with a user input device 40, a global positioning system "GPS" 66 and a display 44. Each of these devices can be located in the user's vehicle in order to track the user 8 as the user 8 travels.

The user input device 40 can be a keyboard, a key pad, a touch screen, a microphone or other input device. The user 8 utilizes the user input device 40 to supply information about a desired location the user wishes to visit. The user supplies at least one set of coordinates 24 for the desired location, a name 25 for the desired location, and a distance of notification 26 into the computing device 42. The coordinates 24 can be entered as a street address or as a longitude and latitude. The location name can be the name of the location, an abbreviation, or a category, such as doctor, gym, or groceries.

The user input device 40 can also input a time window 20 which represents the time frame in which the user 8 desires to visit the desired location.

The time window 20 includes a start time 17 and an end time 18. The time window 20 can be set as small as a few minutes, for example 4:00 pm to 4:15 pm. The time window 20 can also be set to span longer periods of time, for example 2009-2012. The time window 20 can repeat, for example between 3:00 pm to 5:00 pm, Monday through Friday. The time window 20 can include a second time window, which can be independent from the first time window. The second time window can be the same length of time as the first time window, shorter, or longer. The second time window can also overlap the first time window.

The GPS 66 provides the computing device 42 with a current location 16. The GPS 66 can be located in a car with the user 8, thereby providing the current location 16 of a user 8.

The computing device 42 can include data storage 54 and a processor 50, which can be a microprocessor. The data storage 54 can have computer instructions stored thereon which are executed to perform the methods associated with certain embodiments of the present invention. The data storage 54 also stores information input by the user, such as the name 25 and coordinates 24 of locations the user wishes to visit. The computer instructions are executed to monitor the current location 16 in relation to each of the entered coordinates 24 to determine if and when the current location 16 becomes within the distance of notification 26 set for any of the desired locations.

When the current location 16 is within the distance of notification 26 one set of the coordinates 24, computer instructions stored in the data storage 54 of the computing device are executed in order to issue an alert 6 which is communicated to a display 44. The alert 6 can be an audio or visual alert. For example, the alert 6 can be visually displayed on a screen or the alert 6 can be audibly played through speakers.

The alert 6 indicates the user 8 is within the distance of notification 26 to a destination they expressed an interest in visiting. The alert can prompt the user for an action by displaying a message asking if the user would like to visit this destination at this time. The user then enters a response 30, which can be selected from "yes," "no," or "cancel." The user can respond through the user input device 40, which can be a touch screen, a key pad, or a microphone used in conjunction with voice recognition software.

In the event that the user responds "yes" the computing device 42 can utilize programmed maps in conjunction with the current location 16 determined by the GPS 66 in order to map out a route 72 from the current location 16 to the coordinates 24 of the desired location. The route 72 can be shown on a display 44, such as a screen or can be audible turn by turn directions.

In the event the user 8 responds "no," the particular alert relating to this particular location is turned off. The alert can be turned off for a set period for time, such as thirty minutes or two hours, but the alert can also be turned off until the user leaves the proximity of the desired location.

In the event the user 8 responds "cancel" further alerts can be turned off for the current trip.

FIG. 1 further illustrates an embodiment which includes a third party 62 communicating with the computing device 42. This communication can be accomplished through a network 74, such as satellite network, a cellular network, a local area network, a wide area network or global communication network.

The third party 62 can provide third party alerts 80 to which a user 8 subscribes. The third party 62 can have a third party digital device 86 for communicating alerts through the network 74 to the computing device 42. The third party alerts 80 can include hazard alerts. In one embodiment the third party digital devices can be a third party digital notification system for generating hazard alerts. In one embodiment, the third party user alerts can be used by the processor 50 and the GPS 66 in conjunction with preprogrammed maps stored in the data storage 54 of the computing device 42 to create and display routes around the hazards. In an embodiment the route 72 displayed on the display can be a detour route.

The third party alerts 80 can also include vendor or location specific alerts to which a user can subscribe, in which case the third party digital device can comprise a custom alert system from specific vendors. This system can communicate information about a third party vendor's facility location as well as private sales information relating to sales and promotions times. This information can be communicated through the network to the computing device for producing alerts when the user passes within the distance of notification of an ongoing sale or promotional offer.

In another embodiment, the network can be used to communicate alerts from the computing device to another digital device, such as a user's cell phone.

In one embodiment the computing device 42 can include a random selection generator 56 which can be used to randomly select one establishment from a list of establishments. The random selection generator 56 can be used to select new restaurants or other forms of entertainment.

The data storage 54 can include preprogrammed maps which can be used in conjunction with the GPS 66 for mapping routes for trips. The user 8 can input a start location and an end destination in order to prompt the display route 72 such as a turn by turn route.

In one embodiment each desired location can be assigned a priority code by the user, and the priority codes can be stored in the data storage of the computing device. Locations can also be sorted by category, where each category can be assigned a different priority code. When an alert 6 is issued the alert can have different audio decibel levels, different audio tunes, different flashing lights or different digital animations on the display 44 for each priority code. In this way the category of the alert can by readily and easily ascertained by the user based on the audible and visual differences in the alerts associated with each priority code. For example, a hazard alert can have a higher audible volume in order to attract the user's attention.

FIG. 2 illustrates a flow diagram 200 of a method in accordance with certain embodiments of the present invention.

At step 202 the method can comprise establishing a current location 16 of a user associated with a processor 50 for tracking the location of the user 8. A GPS 66 establishes the current location 16 of the user 8 and the user's associated processor 50. The GPS 66 communicates the current location 16 to the processor 50 for performing the remaining steps of the method.

At step 204 the method can comprise providing at least one start time 17 associated with at least one end time 18 forming at least one time window 20 and inputting the at least one time window 20 to the processor 50. In one embodiment, the user can provide a time window corresponding to a time frame in which they wish to visit a certain location. In another embodiment, a third party 62 can supply the time window. For example, the time window can represent the duration of a sale or promotional offer from a specific third party 62. The third party 62 can also dictate a time window which reflects ongoing traffic and safety hazards.

At step 206, coordinates 24 for a desired location are entered into the processor 50. In one embodiment, these coordinates can be entered by a user 8. In another embodiment, the coordinates can be provided by a third party 62. A user 8 subscription can provide for a number of establishments preprogrammed into the database associated with the processor 50. In yet another embodiment, coordinates can be communicated from a third party 62 to the processor 50 through a network 74, such as a satellite network, or a cellular network.

At step 208 the name of the desired location is entered into the processor 50. Like the previous step, the user 8 can enter the name or the name can be entered by a third party.

At step 210 a distance of notification 26 can be entered into the processor 50 of the user 8. The distance of notification can designate the distance from a desired location in which the user will be alerted. The distance of notification can be established once for multiple destinations or each destination can have an individual distance of notification.

At step 212 an alert can be requested when the current location 16, being tracked by the GPS 66, is within the distance of notification 26 of the desired location. This comparison can be made by the processor which compares the user's current location to each set of coordinates entered as desired locations. The processor can then execute computer instructions stored in the data storage if a desired location is within the distance of notification.

The alert can be displayed on a screen or a touch screen. The alert can also be an audible alert played through a speaker. In either case, the alert can prompt the user with a statement to the effect they are within a certain distance to one of their desired locations. The alert can also prompt the user 8 for a response 30 with a statement asking if the user would like to proceed to the desired location.

At step 214, in response to the alert, the user can select one of a response from the group of: "yes," "no," and "cancel." When "no" is selected the alert can be turned off and the desired location remains active for future alerts. In one embodiment, when the user selects "yes," the processor can map a route to the desired location using preprogrammed maps and the current location of the user as determined by the GPS.

When the user selects "cancel" alerts can be turned off for the remainder of the trip.

While these embodiments have been described with emphasis on the embodiments, it should be understood that within the scope of the appended claims, the embodiments might be practiced other than as specifically described herein.

What is claimed is:

1. A method for providing at least one alert to a user on proximity to a desired location within a time window, comprising the steps of:
   a. establishing a current location of a user associated with a processor for tracking the location of the user;
   b. providing at least one start time associated with at least one end time forming at least one time window; and inputting the at least one time window into the processor;
   c. entering coordinates of at least one desired location into the processor;
   d. entering at least one name for each entered desired location into the processor;
   e. entering at least one distance of notification into the processor of the user;
   f. requesting an alert when the current location is within the distance of notification of the desired location using computer instructions in data storage associated with the processor for tracking the user; and
   g. providing a response to the alert consisting of a member of the group, yes, no or cancel and when the response to the alert is "no", providing an alert during subsequent time windows in chronology, when the desired location is within the distance of notification.

2. The method of claim 1, wherein the alerts are grouped by a topic, a category, a previously defined to do list, a previous used groups, or combinations thereof.

3. The method of claim 1, wherein the alerts are used for entertainment and the alert notifications are selected by a random selection generator.

4. The method of claim 1, wherein the alerts are grouped and the groups can be assigned different priority codes.

5. The method of claim 4, wherein the priority codes are different audio decibel levels, different audio tunes, different flashing lights, different digital animations, or combinations thereof.

6. The method of claim 1, wherein the user forms a second time window that is either different from the first time window, or identical in duration to the first time window but for at least one different day, or identical in duration to the first time window but overlaps the first time window.

7. The method of claim 1, wherein the first time window is repeated at intervals defined by the user, at standardized intervals, or at intervals specified by a third party.

8. The method of claim 1, wherein the alerts, the responses, or combinations thereof, are standardized messages.

9. The method of claim 1, wherein upon entry of the "yes" response, a route is planned using the processor, preprogrammed maps, and a global positioning system to the desired location's coordinates and presented to the user.

10. The method of claim 9, wherein the user inputs a start location and an end location for the route, and alerts are provided along the route.

11. The method of claim 1, further comprising a network, wherein the network comprises a satellite network, a cellular network, a local area network, a wide area network, a global communication network or combinations thereof.

12. The method of claim 1, wherein the user subscribes to a customized alert system from specific vendors to provide private sales information.

13. The method of claim 1, wherein the user is using a global positioning system for navigation.

14. The method of claim 1, wherein a third party offers alerts to a user when a facility of the third party is within the distance of notification.

15. The method of claim 14, wherein the user subscribes to the third party offered alerts.

16. The method of claim 15, wherein the user receives compensation for subscribing to the third party offered alerts.

17. The method of claim 15, wherein the third party offered alerts are advertising of a service or product.

18. The method of claim 14, wherein the third party is a friend of the user and the alert enables friends to reconnect within the distance of notification.

19. The method of claim 1, wherein a wireless device of the user can be contacted by another digital device of the user, to provide alerts.

20. The method of claim 1, wherein a wireless device of the user is stationary, and then is contacted by a third party digital device and provides an alert when the third party moves into the distance of notification.

21. The method of claim 1, further comprising receiving a hazard alert concerning a hazard from a third party digital notification system, and providing an alert to the user.

22. The method of claim 21, further comprising using global positioning system to provide a detour route around the hazard indicated in the hazard alert.

23. The method of claim 1, wherein the response is an audio response, a mechanical response, a visual response or combinations thereof.

24. The method of claim 1, further comprising the step of forming a report of desired locations not visited.

25. The method of claim 1 further comprising the step of entering a desired approaching direction so the alert will only issue if the approach to the desired location is from the desired approaching direction.

* * * * *